Feb. 2, 1965   H. L. COUNTS   3,167,880
ANIMAL TRAP
Filed Aug. 26, 1963

HERBERT L. COUNTS
*INVENTOR.*

BY James D. Girnan
ATT'Y

---

United States Patent Office 3,167,880
Patented Feb. 2, 1965

---

3,167,880
ANIMAL TRAP
Herbert L. Counts, 522 Idleyld Rte., Roseburg, Oreg.
Filed Aug. 26, 1963, Ser. No. 304,383
1 Claim. (Cl. 43—93)

This invention relates to improvements in animal traps of the type comprising two jaws, with or without teeth, actuated by powerful single or double jump-springs and adapted to be sprung when the victim steps upon a "pan" or tread plate disposed between the jaws, when open, and secured to a lever which functions as a trigger.

It is one of the principal objects of the present invention to provide a trap of the character described wherein the jump-springs are independently laterally swingable relative to each other to thereby render the trap in its entirety self-leveling relative to ground irregularities or those of an animal runway.

Another object of the invention is to provide a trap of this character, formed in a manner which permits the placement and concealment thereof, including a tread plate, in a runway formed in the earth by the animal, and one which requires no bait and which will operate instantly and efficiently at all times.

A further object of the invention is the provision of means for regulating sensitivity of jaw triggering means so that the trap can only be triggered by animals of predetermined weight.

The foregoing and other objects and advantages which will become subsequently apparent reside in the details of construction and operation as more fully hereinafter described and claimed, reference being had to the accompanying drawings forming a part hereof and in which:

Figure 2:
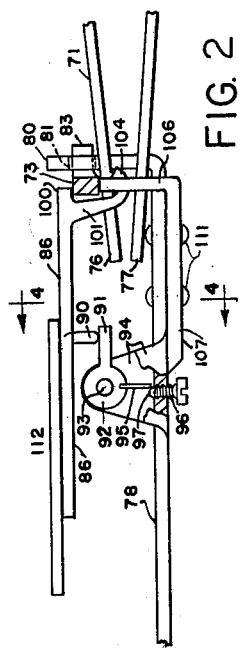
FIGURE 2 is a fragmentary sectional view on an enlarged scale taken approximately along the line 2—2 of FIGURE 1.
Figure 3:
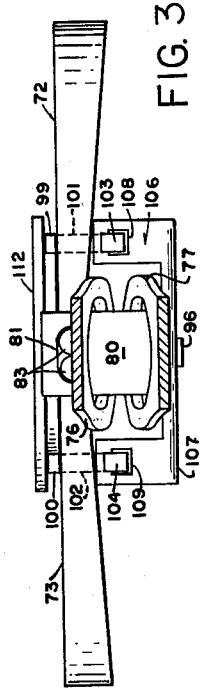
FIGURE 3 is a fragmentary right hand elevational view of FIGURE 1.
Figure 4:
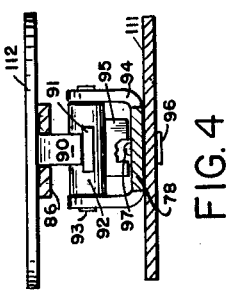
FIGURE 4 is a sectional end elevational view taken approximately along the line 4—4 of FIGURE 2.

With continuing reference to the drawing, reference numeral 78 indicates a flat bass member bent upwardly at both of its ends as at 79–80. Each of these upturned ends is provided with an elongated horizontal opening 81 (see FIG. 3) to serve as bearings for the outwardly turned ends 82–83 of trap jaws 72–73 which are actuated by a pair of jump-springs 70–71 folded over on themselves as shown in FIG. 2 and terminating at their inner ends in two opposing ring portions 75–76, one each disposed below the jaws 72–73 and the other encircling its respective upturned end (79–80) of the base member 78.

A trigger plate 86 has a lug 90 struck downwardly therefrom for operational contact with a flange 91 extending radially from a hub 92 rockably mounted upon a pin 93 carried by the upper end of a pair of transversely opposed lugs 94 bent upwardly from the sides of the base member 78. The hub 92 is provided with a spring steel plate or flange 95 extending downwardly therefrom for engagement with a detent in the form of an adjusting screw 96 extending upwardly through the base member 78 and provided with a blunt or rounded top end 97. The forward end of the trigger plate 86 is bifurcated into two trigger fingers 99 and 100 for engagement with the jaws 72–73 when in a set position as shown in FIGURES 1–4. Integrated with and extending downwardly and forwardly from the trigger fingers 99–100 are two arms 101 and 102 terminating in hook-shaped ends 103 and 104 respectively for hinged attachment to the upturned bifurcated end 106 of a trigger supporting plate 107 by means of openings 108 and 109 therein. This plate 107 is riveted as at 111 to the underside of the base member 78. A pan or tread plate 112 is secured to the trigger plate as at 113.

Figure 1:
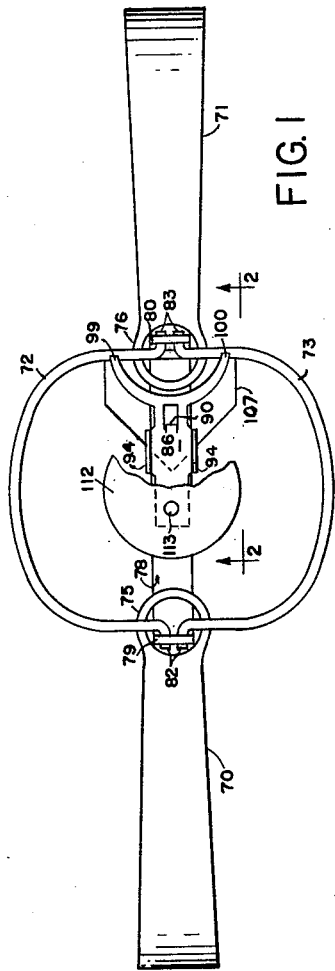
FIGURE 1, is a top plan view of an animal trap made in accordance with my invention.

From the foregoing it will be readily apparent, when the trap is placed on the ground or on an animal runway, with the jaws 72–73 locked in an open position, as shown in FIG. 1, that the weight of an animal stepping upon the pan or tread plate 112 will cause the trigger plate 86 to swing downwardly about the pivot established by its hooked connection as at 104 with the upturned end 106 of the trigger supporting plate 107, and thus pull the trigger fingers 99–100 away from the subjacent inner ends of the jaws 72–73 thus allowing the jaws to snap upwardly into a closed position by the forceful jump-spring action of the now released ends of the springs 70–71.

Such downwardly swinging movement of the free end of the trigger plate 86 will of course be resisted by the spring steel flange 95 bearing against the top end of the adjusting screw 96 by the downward pressure of the lug 90 in engagement with the flange 91 of the hub 92.

Obviously the less resistance offered by the screw 96 the more sensitive the trap will be to trigger action. Conversely, advancing the screw 96 on its threads will require the weight of a heavier animal on the tread plate 112 to trip the trap.

While I have shown a particular form of embodiment of my invention, I am aware that many minor changes therein will readily suggest themselves to others skilled in the art without departing from the spirit and scope of the invention. Having thus described my invention what I claim as new and desire to protect by Letters Patent is:

An animal trap comprising,
an elongated ground engaging base member bent upwardly at both of its ends,
a pair of cooperating jaw members,
means swingably attaching said jaw members to said upwardly bent ends of said base member,
jump-springs interposed between said base member and said jaw members,
means swingably attaching said jump-springs to said bent up ends of said base member for independent lateral movement in a horizontal plane into angular positions relative to the base member,
a trigger plate hingedly superimposed upon said base member in vertical alignment with the longitudinal axis thereof and engageable at one of its ends with said jaw members when the latter are in an open set position,
a lug struck downwardly from said trigger plate intermediate the ends thereof,
a tread plate carried by the opposite end of said trigger means whereby downward movement of the tread plate by weight imposed thereupon will disengage the trigger means from said open jaw members,
opposing lugs integrated with and extending upwardly from said base member intermediate the ends thereof,
a hub rockably mounted between said lugs by a pin extending therethrough,
a rigid flange integrated with and extending radially outward from said hub and bearing upwardly against downwardly struck lug of the trigger plate,
a steel spring plate secured to said hub and extending downwardly therefrom at right angles to said flange,
a detent comprising a vertically disposed adjusting screw extending upwardly through said base member with its top end in contact with the bottom end of said steel plate at one side thereof, whereby the tripping range of sensitivity of the trap may be regulated from the minimal resistance of said top end of the adjusting screw when in contact with the bottom end of said spring plate to a greater degree by upward advancement of the adjusting screw.

References Cited by the Examiner

UNITED STATES PATENTS

| | | | |
|---|---|---|---|
| 407,129 | 7/89 | Seymour | 43—93 |
| 1,445,203 | 2/23 | Dewey | 43—92 |
| 1,458,630 | 6/23 | Rosendahl | 43—92 |
| 1,879,939 | 9/32 | Lehn et al. | 43—93 |

ABRAHAM G. STONE, *Primary Examiner.*